(12) United States Patent
Robinson et al.

(10) Patent No.: US 9,091,179 B2
(45) Date of Patent: Jul. 28, 2015

(54) VARIABLE GEOMETRY TURBINE AND ASSEMBLY THEREOF

(75) Inventors: Lee J. Robinson, Huddersfield (GB); Stephen Garrett, Highburton (GB)

(73) Assignee: Cummins Ltd., Huddersfield (GB)

( * ) Notice: Subject to any disclaimer, the term of this patent is extended or adjusted under 35 U.S.C. 154(b) by 731 days.

(21) Appl. No.: 13/208,485

(22) Filed: Aug. 12, 2011

(65) Prior Publication Data

US 2012/0114464 A1  May 10, 2012

(30) Foreign Application Priority Data

Aug. 13, 2010  (GB) .................................. 1013654.7
Sep. 10, 2010  (GB) .................................. 1015052.2

(51) Int. Cl.
| | | |
|---|---|---|
| F01D 17/14 | (2006.01) | |
| F01D 17/16 | (2006.01) | |
| F02B 37/22 | (2006.01) | |
| F02B 37/24 | (2006.01) | |

(52) U.S. Cl.
CPC ............ *F01D 17/167* (2013.01); *F01D 17/143* (2013.01); *F02B 37/22* (2013.01); *F02B 37/24* (2013.01); *F05D 2220/40* (2013.01); *F05D 2260/406* (2013.01); *Y02T 10/144* (2013.01)

(58) Field of Classification Search
USPC ......... 415/148, 149, 157, 158, 159, 166, 167; 29/889.21, 889.22
See application file for complete search history.

(56) References Cited

U.S. PATENT DOCUMENTS

| | | | | |
|---|---|---|---|---|
| 2,751,806 | A | * | 6/1956 | Dickie ........................... 411/542 |
| 5,214,920 | A | | 6/1993 | Leavesley |
| 5,231,831 | A | * | 8/1993 | Leavesley ........................ 60/602 |

FOREIGN PATENT DOCUMENTS

| | | | |
|---|---|---|---|
| EP | 0884453 | A1 | 12/1998 |
| EP | 2267316 | A1 | 12/2010 |
| GB | 2456110 | A | 7/2009 |
| GB | 2468871 | A | 9/2010 |
| WO | 9814691 | | 4/1998 |
| WO | WO 2008149060 | * | 11/2008 |

(Continued)

OTHER PUBLICATIONS

United Kingdom Search Report GB 1013654.7, Cummins Ltd., Nov. 23, 2010.

(Continued)

*Primary Examiner* — Nathaniel Wiehe
*Assistant Examiner* — Kayla McCaffrey
(74) *Attorney, Agent, or Firm* — Taft Stettinius & Hollister LLP

(57) ABSTRACT

A variable geometry turbine has a housing for receipt of the turbine wheel. A gas flow control mechanism in the housing upstream of said turbine wheel is operable to control gas flow through a gas flow inlet passage. The control mechanism has a movable nozzle ring or shroud for varying the size of the gas flow inlet passage. A transmission mechanism for connection between an actuator and the control mechanism converts movement applied by the actuator into movement shroud or nozzle ring. The transmission mechanism comprises a yoke having a shaft that is rotatably supported by a wall of the housing. The yoke defines arms that extend outwardly of the shaft and which engage with the shroud or nozzle ring. There is provided at least one recess defined in an inside surface of the housing, the recess extending from shaft rotation axis and configured to allow passage of an end of the yoke shaft along it during insertion of the yoke into the housing.

15 Claims, 9 Drawing Sheets

(56) References Cited

FOREIGN PATENT DOCUMENTS

| WO | 2009010711 | A1 | 1/2009 |
| WO | 2009133334 | A2 | 11/2009 |

OTHER PUBLICATIONS

United Kingdom Search Report GB1114046.4, Cummins Ltd., Oct. 26, 2011.

* cited by examiner

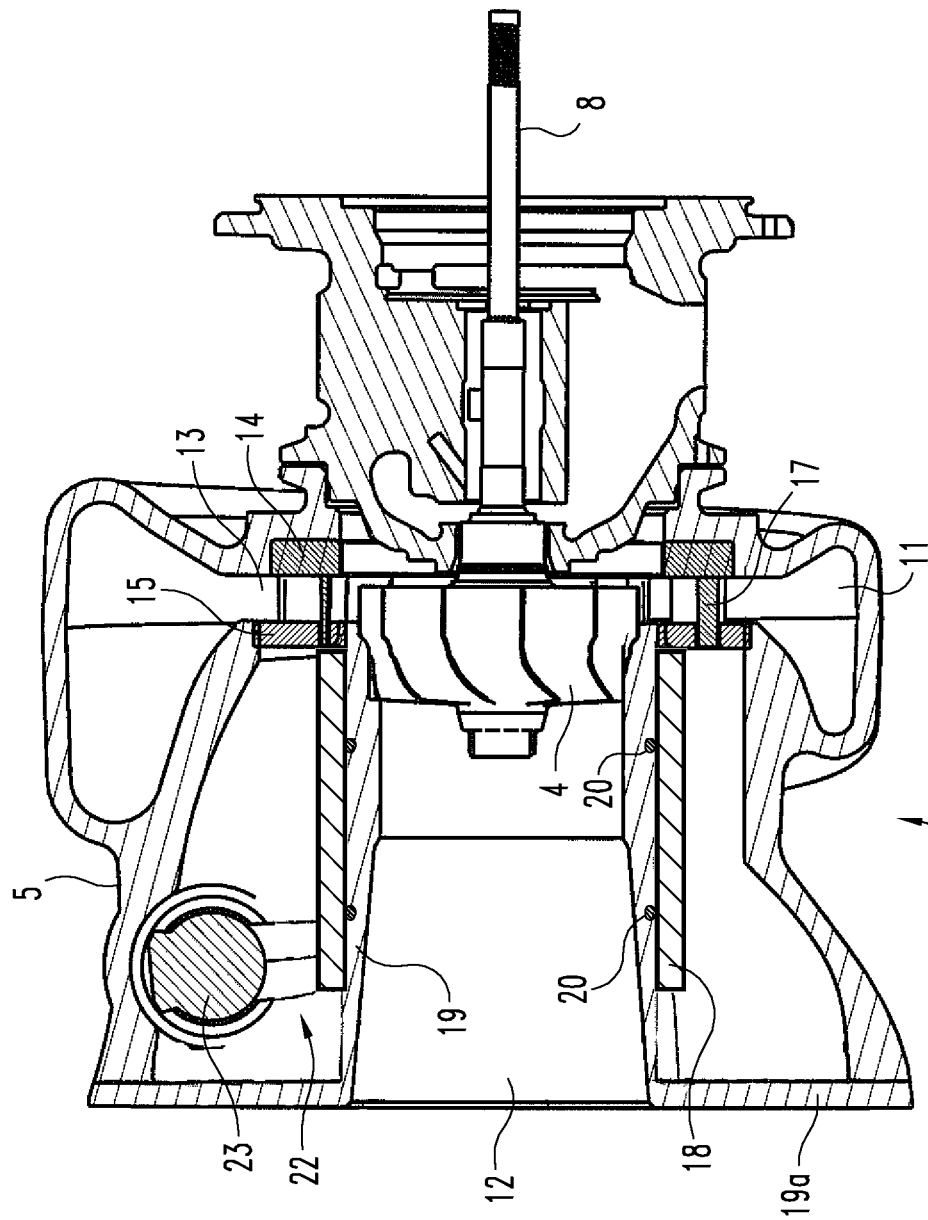

VARIABLE GEOMETRY TURBINE AND ASSEMBLY THEREOF

RELATED APPLICATIONS

The present application is related to, and claims priority to United Kingdom Patent Application No. 1013654.7 filed on Aug. 13, 2010 and United Kingdom Patent Application No 1015052.2 filed on Sep. 10, 2010, which are incorporated herein by reference.

The present invention relates a variable geometry turbine and to a method of assembly of such a turbine.

Turbochargers are well known devices for supplying air to the intake of an internal combustion engine at pressures above atmospheric (boost pressures). A conventional turbocharger essentially comprises an exhaust gas driven turbine wheel mounted on a rotatable shaft within a turbine housing. Rotation of the turbine wheel rotates a compressor wheel mounted on the other end of the shaft within a compressor housing.

The compressor wheel delivers compressed air to the engine intake manifold. The turbocharger shaft is conventionally supported by journal and thrust bearings, including appropriate lubricating systems, located within a central bearing housing connected between the turbine and compressor wheel housing.

The turbine stage of a conventional turbocharger comprises: a turbine housing defining a turbine chamber within which the turbine wheel is mounted; an annular inlet passageway defined in the housing between facing radially extending walls arranged around the turbine chamber; an inlet arranged around the inlet passageway; and an outlet passageway extending from the turbine chamber. The passageways and chamber communicate such that pressurised exhaust gas admitted to the inlet flows through the inlet passageway to the outlet passageway via the turbine chamber and rotates the turbine wheel. It is known to improve turbine performance by providing vanes, referred to as nozzle vanes, in the inlet passageway so as to deflect gas flowing through the inlet passageway towards the direction of rotation of the turbine wheel.

Turbines of this kind may be of a fixed or variable geometry type. Variable geometry turbines differ from fixed geometry turbines in that the size of the inlet passageway can be varied to optimise gas flow velocities over a range of mass flow rates so that the power output of the turbine can be varied in line with varying engine demands.

Nozzle vane arrangements in variable geometry turbochargers can take different forms. In one type, known as a sliding "nozzle ring", the vanes are fixed to an axially movable wall that slides across the inlet passageway. The axially movable wall moves towards a facing shroud plate in order to close down the inlet passageway and in so doing the vanes pass through apertures in the shroud plate. The position of the nozzle ring relative to the shroud is adjustable to control the width of the inlet passageway. For instance, as gas flowing through the turbine decreases the inlet passageway width may also be decreased to maintain gas velocity and optimise turbine output. In an alternative arrangement vanes extend from a fixed wall through slots provided in a moving shroud plate.

The moving nozzle ring or shroud plate is generally supported on rods extending parallel to the axis of rotation of the turbine wheel and is moved by an actuator, which is operable to displace the rods in an axial direction. Various types of actuators may be used to move the nozzle ring or shroud plate including, for example, a pneumatic actuator or a motor and gear transmission which are generally mounted on the outside of the housing. The actuator is coupled to the nozzle ring by a yoke fixed on a separately formed shaft that is received in journal bearings in the wall of the turbine housing. The yoke rotates with the shaft and defines two spaced apart arms which extend away from the shaft on opposite sides of the turbine axis to engage portions of the support rods that extend out of the housing into the neighbouring bearing housing. Assembly of the mechanism is performed by presenting the yoke to the interior of the bearing housing and moving it into a cavity around the bearing assembly, the shaft is then inserted through the bearing housing wall, from the outside, into the bearings and through a central bore defined in the yoke. A clamp integrally formed with the yoke is then tightened by turning a screw so as to fix the yoke to the shaft.

The end of each arm of the yoke has a pin that extends into a sliding block that is in turn received in a slot defined in a respective support rod. Operation of the actuator causes the yoke and shaft to pivot about the shaft axis such that the pins on the arms describe an arc of a circle and that in turn causes the blocks to move axially and slide vertically within the slots defined in the support rods. Axial movement of the nozzle ring or shroud plate can thus be achieved by rotation of the yoke about the shaft.

In applications where a smaller variable geometry turbocharger is required (e.g. for use on smaller engines or as a high pressure turbocharger in a two-stage system) there are space constraints and there is a need to reduce the size of the spatial envelope occupied by the turbocharger by making it more compact without impairing its performance.

It is one object of the present invention, amongst others, to provide for a compact turbocharger design. It is also an object to provide for an alternative or an improved variable geometry turbine.

According to a first aspect of the present invention there is provided a variable geometry turbine comprising a turbine wheel mounted within a housing for rotation about a turbine axis, a gas flow inlet passage upstream of said turbine wheel, and a gas flow control mechanism located within the housing upstream of said turbine wheel and operable to control gas flow through said gas flow inlet passage, the control mechanism comprising a movable member for varying the size of the gas flow inlet passage, the movable member being movable in a direction substantially parallel to the turbine axis, a transmission mechanism for connection between an actuator and the control mechanism for converting movement applied by the actuator into movement of the movable member, the transmission mechanism comprising a yoke having a shaft that is rotatably supported in at least one support provided in a wall of the housing for rotation about a shaft rotation axis, the yoke defining arms that extend outwardly of the shaft and which engage with the movable member such that rotation of the yoke effects movement of the moveable member, wherein there is provided at least one recess defined in an inside surface of the housing, the at least one recess extending away from the at least one support and away from the shaft rotation axis, the at least one recess configured to allow passage of an end of the yoke shaft along it during insertion of the yoke into the housing The recess in the inside surface facilitates insertion of the yoke into the housing from an open end such as an outlet end or an opposite end that is typically attached to a bearing housing. It may in addition accommodate rotation of the yoke about its shaft during actuation of the gas control mechanism by providing sufficient clearance for passage of one of the arms. The invention provides for a compact turbine housing with a small spatial envelope allowing it to be used in circumstances where there are space constraints but without impairing the performance. The provision of the yoke inside the turbine housing along with the movable member allows for a compact design.

The gas flow control mechanism may comprise a nozzle ring having an array of vanes in the annular inlet passageway for guiding flow of gas to the turbine wheel. The movable member may be a movable shroud for movement over a fixed nozzle ring or may be a nozzle ring which is moveable relative to a fixed shroud. The shroud may comprise a shroud plate with slots for receipt of vanes of the nozzle ring. It may further comprise a sleeve from which the shroud plate extends, the sleeve forming part of the movable member. The shroud plate may be in the form of an annular flange extending radially outwardly of the sleeve. The sleeve may be supported for axial movement by a shroud support which may be in the form of a cylinder and the interior surface of which may define a gas outlet passageway of the turbine. The gas outlet passageway may extend from the turbine wheel and the end of the support proximate the turbine wheel may have a profile that is complementary to that of the edges of the blades of turbine wheel. The shroud support may have a radially outwards extending flange that defines a cover for covering a radially outer part of an outlet opening of the turbine housing. The cover may be fixed to an edge of the turbine housing which defines the outlet opening.

The arms may extend towards the inside surface of the housing.

The at least one recess preferably extends in a direction away from the shaft. It may be disposed between the wall portion in which the shaft is received and a gas outlet end of the housing.

The shaft may define an axis that is substantially perpendicular to and radially offset from the turbine axis such that it effectively describes a chord that cuts an imaginary circle described by a line that passes around the turbine housing.

The at least one support may be provided by a first bore in which the shaft is rotatably supported directly or in a first bearing such as a journal bearing. The at least one recess may extend from the first bore. There may be a second bore in the housing wall for supporting the shaft in rotation, directly or in a second bearing. It may support the shaft proximate an end thereof. The first and second bores may be blind bores or may penetrate through the wall of the housing.

The arms may each have an end distal from the shaft. As the yoke rotates the ends describe an arc of a circle. The distal end is for connection to the movable member and may support a connection that accommodates limited relative displacement between the arms and the movable member. The connection may comprise a pin on which a sliding block is pivotally received. The sliding block may be captively received in sliding engagement with the movable member. The at least one recess may be provided proximate to the arc described by the distal end of at least one of the arms.

The at least one recess may extend from the at least one support where the shaft is supported in the housing to a position proximate the arc described by the distal end of the nearest arm. This recess may extend beyond the arc.

The at least one recess may be elongated. It may extend in a substantially circumferential direction around an imaginary line occupied by the rotational axis of the turbine, although it may also have an axial component (extending in the direction of the turbine axis).

The bore may be defined by at least one boss for receipt of the shaft in rotation. The at least one recess may extend from the interior of the at least one boss. The, or each, boss may be defined on an outer surface of the housing, the bore defined by the boss extending outwardly from the internal surface of the housing. The at least one boss may receive a journal bearing in which the shaft is supported for rotation.

There may be a further recess in the inside surface of the housing, on the opposite side of the yoke to the at least one recess referred to above. The further recess may be proximate the arc described by one of the distal ends of the arms. The further recess may be disposed between the second bore and the outlet end of the housing.

The yoke may be disposed between the housing and the movable member. The movable member may be disposed between the yoke and the axis of turbine.

The housing may define a turbine an outlet end, the yoke being disposed at or near the outlet end. The opposite end may be for connection to a bearing housing for supporting bearings for a shaft of the turbine wheel.

The shaft and arms of the yoke are preferably integrally formed.

According to a second aspect of the present invention there is provided a method of assembling a variable geometry turbine, the turbine having a housing for receipt of a turbine wheel, a gas flow control mechanism located within the housing for location upstream of said turbine wheel and operable to control gas flow through a gas flow inlet passage, the control mechanism comprising a movable member for varying the size of the gas flow inlet passage by translating in a direction substantially parallel to the turbine axis, a transmission mechanism for connection between an actuator and the control mechanism and comprising a yoke having a shaft supported for rotation in first and second bores defined in the housing wall for rotation about a shaft rotation axis, the yoke defining arms that extend outwardly of the shaft and at least one recess defined in the inside surface of the housing, the method comprising presenting a first end of the shaft into a first bore from an outlet end of the turbine housing, moving a second end of the shaft into the turbine housing such that it occupies the at least one recess, moving the second end along the at least one recess in a direction towards the bore and the shaft rotation axis, moving the second end into the second bore, securing the shaft for rotation in the housing wall and attaching the yoke to the control mechanism.

The yoke may be introduced into the housing through an open outlet end. The outlet end may be partially closed to leave an outlet passageway for the gas exiting the turbine wheel.

The second end of the shaft may be moved along the at least one recess by rotating the yoke substantially about an axis that is transverse to the shaft rotation axis. The transverse axis may be substantially parallel to, or coincident with, the turbine axis.

The first and second bores may pass through the wall and bearings may be inserted into the bore from outside the housing.

A second one of the bearings may be partially inserted into the second bore before the yoke is inserted and then it may be fully inserted over the second end of the shaft when the yoke is in position.

According to another aspect of the present invention there is provided a turbomachine such as a turbocharger incorporating a variable geometry turbine as defined above.

According to a yet further aspect of the present invention there is provided a turbine housing for a variable geometry turbine as defined above. The turbine housing has at least one recess defined in the inside surface of the housing and which extends from a wall portion in which a yoke of the control mechanism is supported in use. The at least one recess extends from the wall portion and is sized to allow passage of an end of the yoke shaft along it during insertion of the yoke into the housing.

A specific embodiment of the present invention will now be described, by way of example only, with reference to the accompanying drawings, in which:

FIG. 1a shows the same view as FIG. 1 but with the shroud plate and shroud support shown in schematic form;

Figure 1:
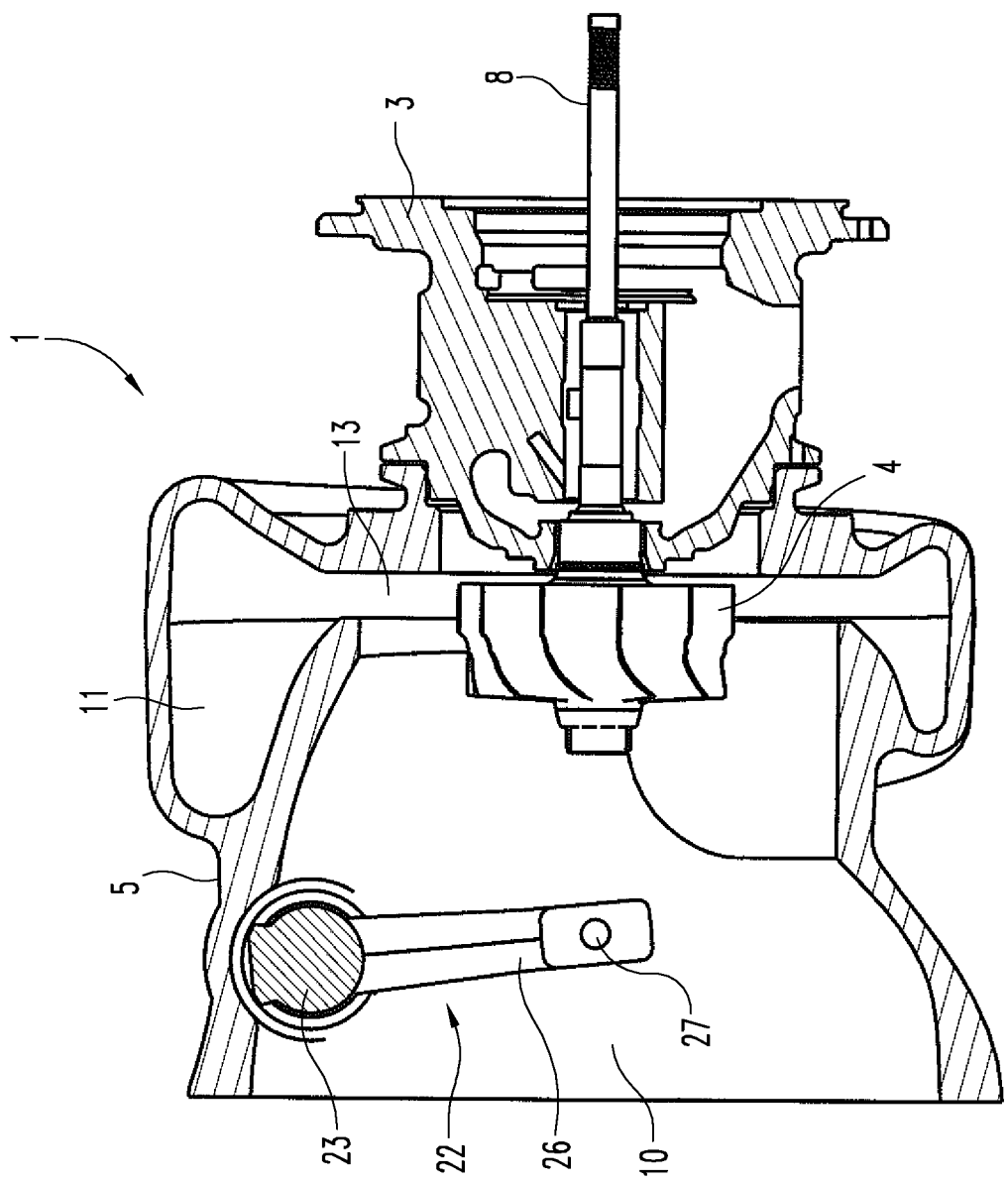
FIG. 1 is a longitudinal sectioned view of part of a turbocharger in accordance with the present invention, with a shroud plate and shroud support removed for clarity.

Referring now to FIGS. 1 and 1a of the drawings, the illustrated variable geometry turbocharger comprises a turbine 1 joined to a compressor (now shown) via a central bearing housing 3. The turbine 1 comprises a turbine wheel 4 rotating within a turbine housing 5. Similarly, the compressor comprises a compressor wheel that rotates within a compressor housing. The turbine wheel 4 and compressor wheel are mounted on opposite ends of a common turbocharger shaft 8 that extends through the central bearing housing 3. In FIG. 1, the compressor impeller would be mounted on the end of the shaft that protrudes from the left of the bearing housing 3.

As is conventional, the bearing housing 3 has a central portion which houses journal bearing assemblies located towards the compressor and turbine ends of the bearing housing respectively.

In use, the turbine wheel 4 is rotated by the passage of exhaust gas passing over it from the internal combustion engine. This in turn rotates the compressor wheel that draws intake air through a compressor inlet and delivers boost air to the inlet manifold of an internal combustion engine via an outlet volute.

The turbine housing 5 defines an inlet chamber 11 (typically a volute) to which the exhaust gas from an internal combustion engine is delivered and an outlet end opening 10. The exhaust gas flows from the inlet chamber 11 to an axially extending outlet passageway 12 (shown in FIG. 1a only) via an annular inlet passageway 13 and turbine wheel 4. The inlet passageway 13 is defined on one side by the face of a radial wall of a fixed annular wall member 14, commonly referred to as a "nozzle ring", and on the opposite side by an annular shroud plate 15 facing the nozzle ring 14 that is movable in the axial direction. The shroud plate 15 and nozzle ring 14 are shown in FIG. 1a but not in FIG. 1.

The nozzle ring 14 supports an array of circumferentially and equally spaced inlet vanes 17 each of which extends axially across the inlet passageway 13 and projects through a corresponding slot in the shroud plate 14. The vanes 17 are orientated to deflect gas flowing through the inlet passageway 13 towards the direction of rotation of the turbine wheel 4.

The speed of rotation the turbine wheel 4 is dependent upon the velocity of the gas passing through the annular inlet passageway 13. For a fixed rate of mass of gas flowing into the inlet passageway, the gas velocity is a function of the gap between the radial wall of the nozzle ring 14 and the shroud plate 15. It is this gap that effectively defines the size of the passageway 13 and is adjustable by controlling the axial position of shroud plate 15. As the gap is reduced, the velocity of the gas passing through it increases.

The shroud plate 15 is in the form of a radial flange that extends outwardly from a sleeve 18 with which it is integrally formed and is penetrated by the slots for receipt of the vanes. The sleeve 18 is supported for movement in the axial direction by a shroud support cylinder 19 that is concentric with the axis of rotation of the turbine wheel 4. The external surface of the support cylinder supports the sleeve for axial movement on a pair of axially spaced seals 20 whereas the internal surface defines the outlet passageway 12 which extends from the turbine wheel to the outlet end opening 10 of the housing 5 in a direction substantially parallel to the turbine axis. The support cylinder 19 has a radially outwards extending flange 19a at the outlet end and its periphery is fixed to an edge of the turbine housing 5 that serves to define the outlet end opening 10. At the turbine wheel end, the support cylinder 19 has an edge that is profiled to complement the profile of the edge of the blades of the turbine wheel 5.

The axial position of the shroud plate 15 and sleeve 18 is controlled by an actuator (not shown) in response to signals from a controller such as the engine management system. The actuator may be of any suitable type such as, for example, a pneumatic device or a rotary electric actuator which is mounted on the outside of the turbine housing 5. A transmission linkage interconnects an output shaft of the actuator and the sleeve 18 so that the stroke of output shaft of the actuator is translated into axial movement of the shroud plate 15.

Figure 11:
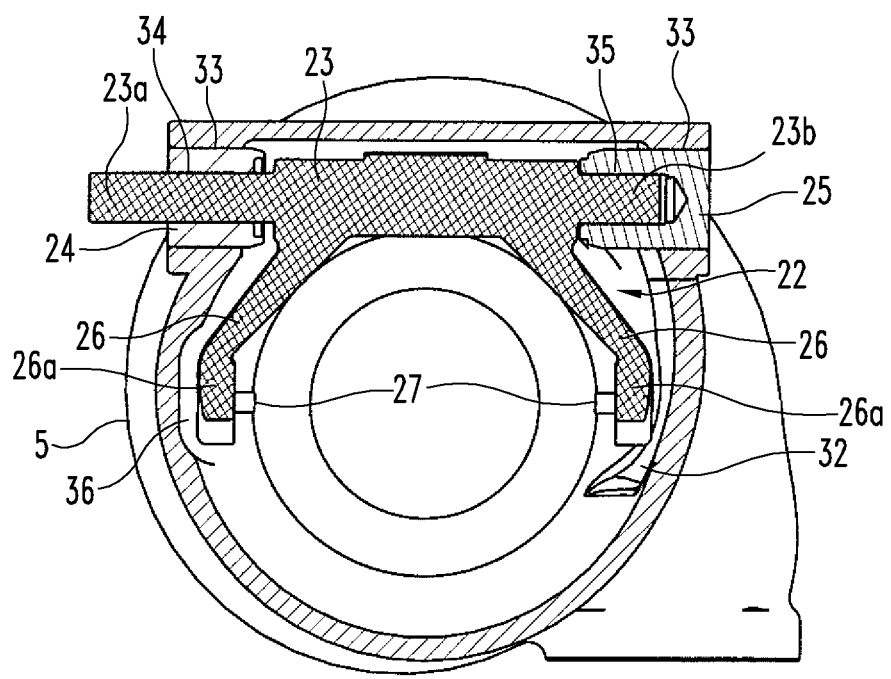
FIG. 11 is a sectioned view corresponding to that of FIG. 10, showing the yoke and bearings installed in the turbine housing.

The transmission linkage comprises a yoke 22 that is disposed within the turbine housing 5 towards the outlet end in a radial clearance between a wall of the turbine housing 5 and the shroud support cylinder 19, as can be seen in FIGS. 1 and 1a. The yoke 22 has a shaft 23 that is supported for rotation at each end 23a, 23b in bearings 24, 25 (see FIG. 11) disposed in the wall of the turbine housing 5 and a pair of spaced arms 26 that extend outwards from the shaft 23 in diverging directions for connection to the shroud sleeve 18. A first end 23a of the shaft 23 extends out of the housing 5 and beyond the bearing 24 for connection to the actuator and in operation the actuator rotates the shaft 23 so that the arms 26 describe and an arc about the shaft rotation axis. Each of the arms terminates in an end 26a that extends in a direction that is substantially along a radial line from the shaft, the ends 26a being substantially parallel rather than continuing along the divergent directions of the rest of the arms 26.

Figure 12:
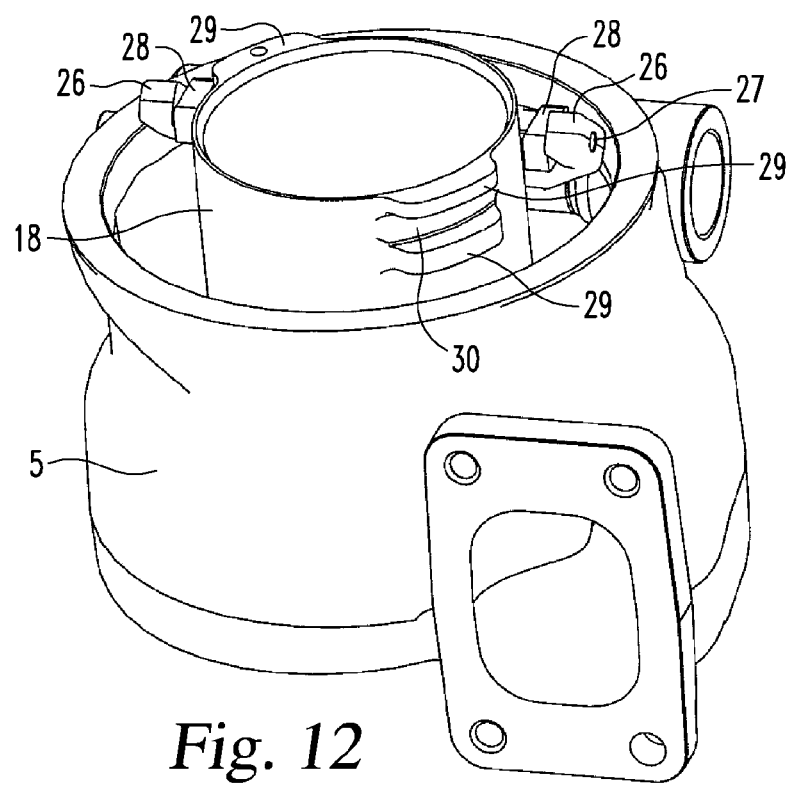
FIGS. 12 and 12a are perspective view of the turbine housing showing installation of a shroud sleeve.
Figure 12A:
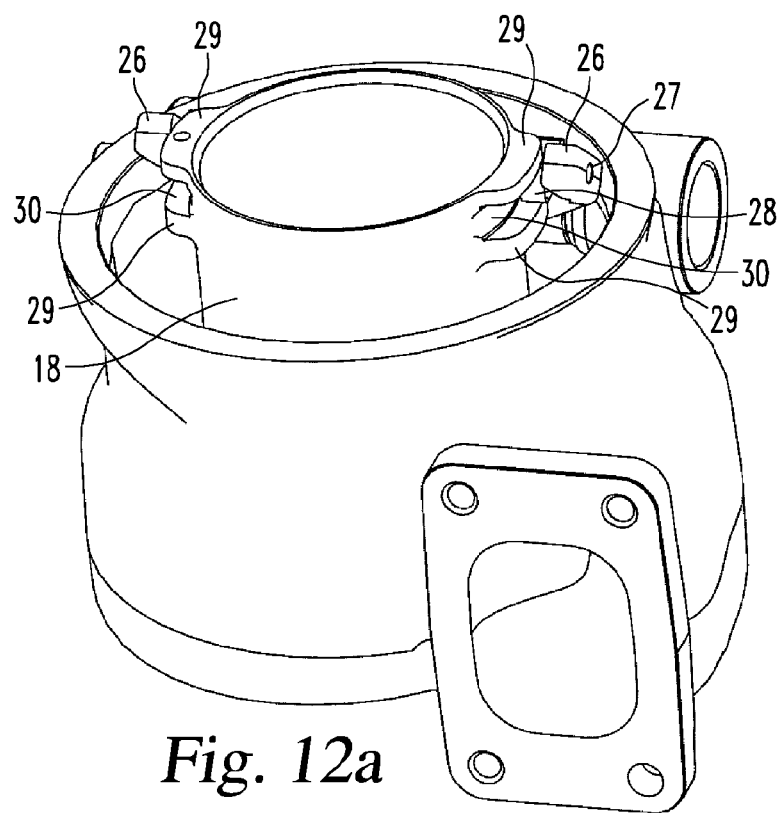

The yoke arms 26 are pivotally connected to the shroud sleeve 18 by way of pins 27 which extend inwardly from each arm 26 into respective sliding blocks 28 which are shown only in FIGS. 12 and 12a. The blocks 28 are received between pairs of arcuate ribs 29 defined on the outside wall of the sleeve 18, the ribs 29 extending in a circumferential direction and defining a slot 30 between them. The pins 27 are fixed within the arm ends 26a and are pivotally received within the sliding blocks 28 which are constrained against movement relative to sleeve by the ribs 29 except in the direction along the respective slots 30. The sliding movement of the blocks 28 in the slots 30 accommodates the off-axis movement of the pins 27. Movement of the shroud sleeve 18 and plate 15 along the axis of the turbine is thus controlled by rotation of the yoke 22.

The turbine housing 5 defines an inlet chamber 11 (typically a volute) to which the exhaust gas from an internal combustion engine is delivered and an outlet end opening 10. The exhaust gas flows from the inlet chamber 11 to an axially extending outlet passageway 12 (shown in FIG. 1a only) via an annular inlet passageway 13 and turbine wheel 4. The inlet passageway 13 is defined on one side by the face of a radial wall of a fixed annular wall member 14, commonly referred to as a "nozzle ring", and on the opposite side by an annular shroud plate 15 facing the nozzle ring 14 that is movable in the axial direction. The shroud plate 15 and nozzle ring 14 are shown in FIG. 1a but not in FIG. 1.

A first of the bearings, 24, has a through bore 34 so that the first end 23a of the yoke shaft protrudes from the bearing 24 and turbine housing 5 for connection to the actuator. The other of the bearings has a blind bore 35 for receipt of the opposite end 23b of the yoke shaft 23.

The wall of the turbine housing 5 at the outlet end has a pair of recesses 36, 37 defined in its inner surface on opposite sides of the turbine axis. A first of these, 36, is disposed below the first bearing 24 and is centred about a location that is substantially level with the turbine axis and is designed to allow passage of one of the ends 26a of one of the yoke arms 22. As such, it provides a clearance around the end of the yoke arm 22. This is best seen in FIGS. 2, 3, 5, 6 and 8 to 11. The other recess 37, which is best viewed in FIGS. 7 to 11, has a different elongated profile in that it extends from the boss 32 that receives the bearing 25 around the inside of the turbine housing 5 to a location below the other yoke arm end 26a just below the level of the turbine axis. This recess 37 is designed to facilitate insertion of the yoke into the turbine housing 5. In the embodiment shown it extends in a substantially circumferential direction around the turbine axis.

The insertion of the yoke 22 into the turbine 1 will now be described in relation to FIGS. 2 to 11.

Figure 2:
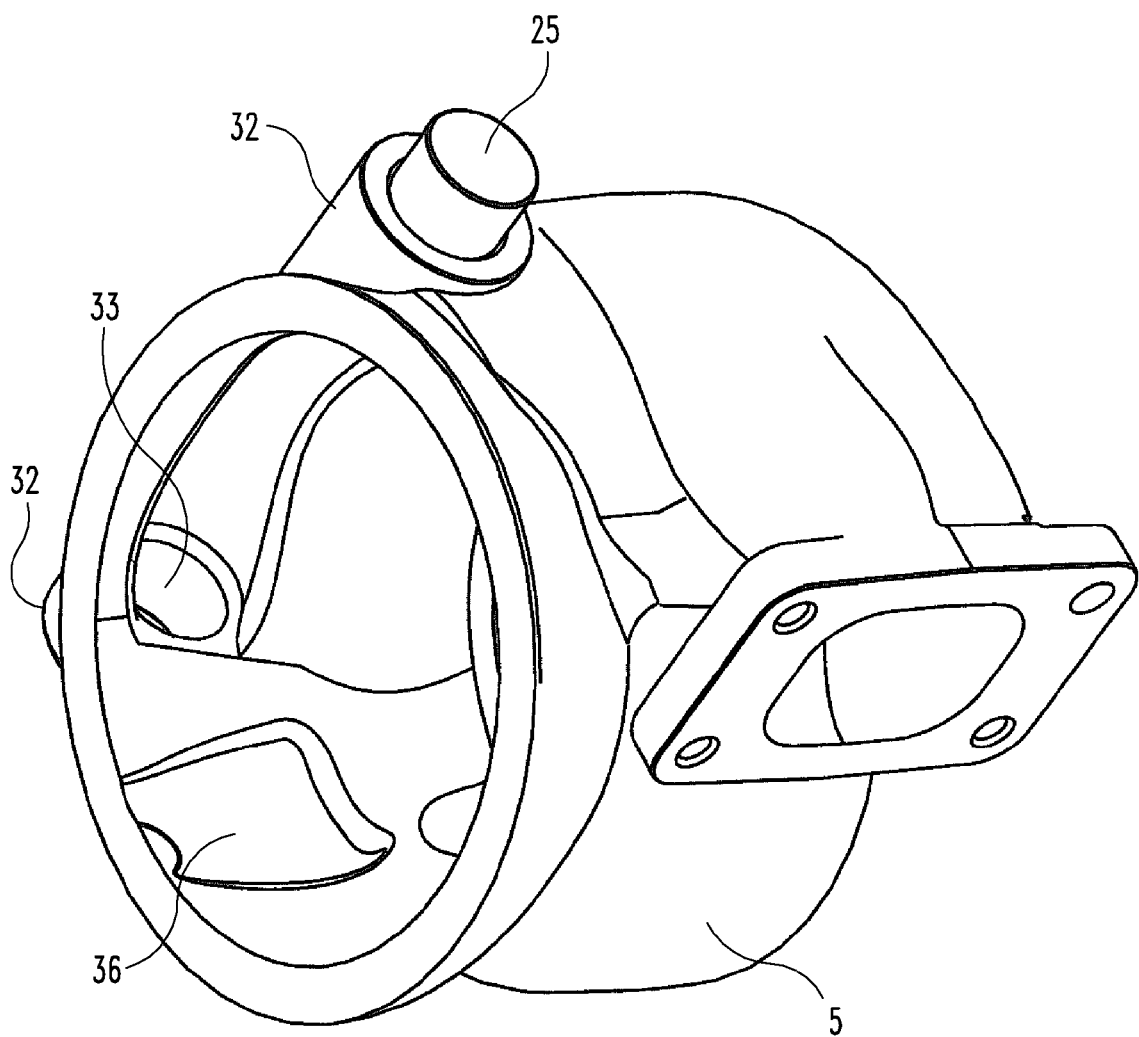
FIG. 2 is a perspective view of the turbine housing of the turbocharger of FIG. 1.
Figure 3:
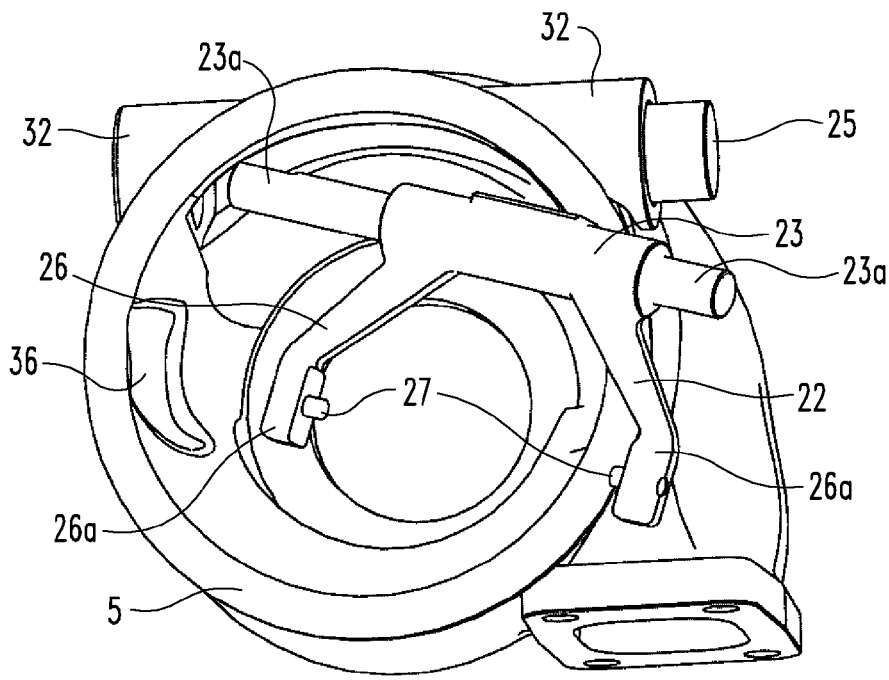
FIG. 3 is a perspective view of the turbine housing of FIG. 2 shown looking into the outlet end, and illustrating the insertion of the yoke of the variable geometry mechanism.
Figure 4:
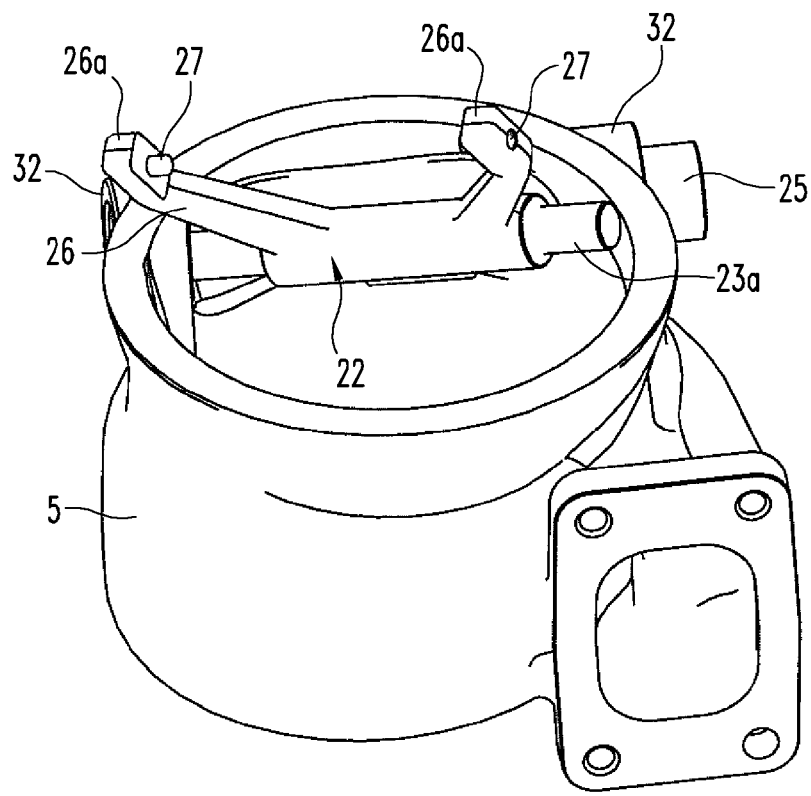
FIG. 4 is a perspective view of the turbine housing looking in the direction of the inlet end illustrating further insertion of the yoke.
Figure 5:
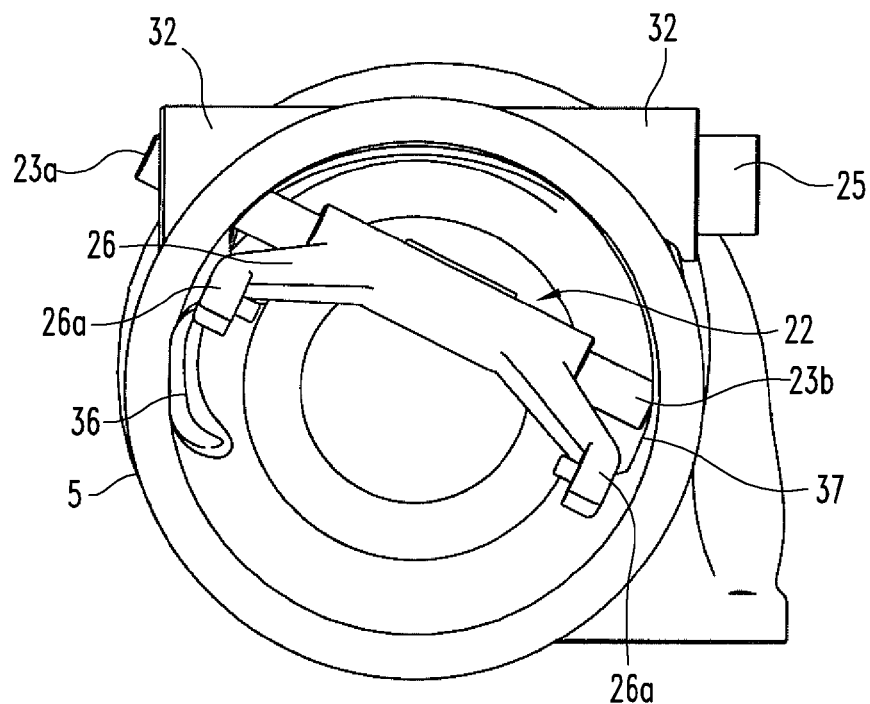
FIG. 5 is a view looking into the outlet end of the turbine, illustrating further insertion of the yoke.
Figure 6:
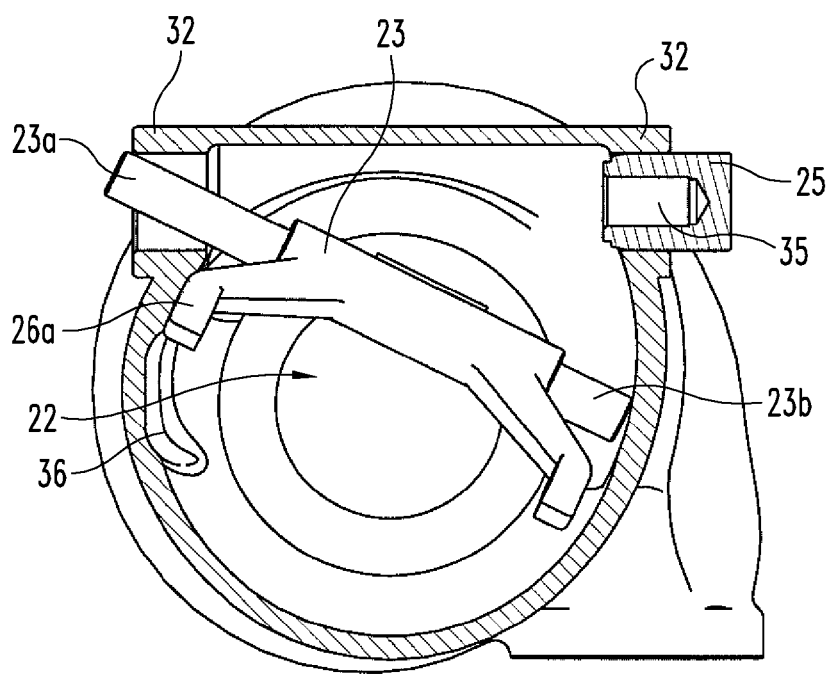
FIG. 6 is a view corresponding to that of FIG. 5, but with the turbine housing shown sectioned.
Figure 7:
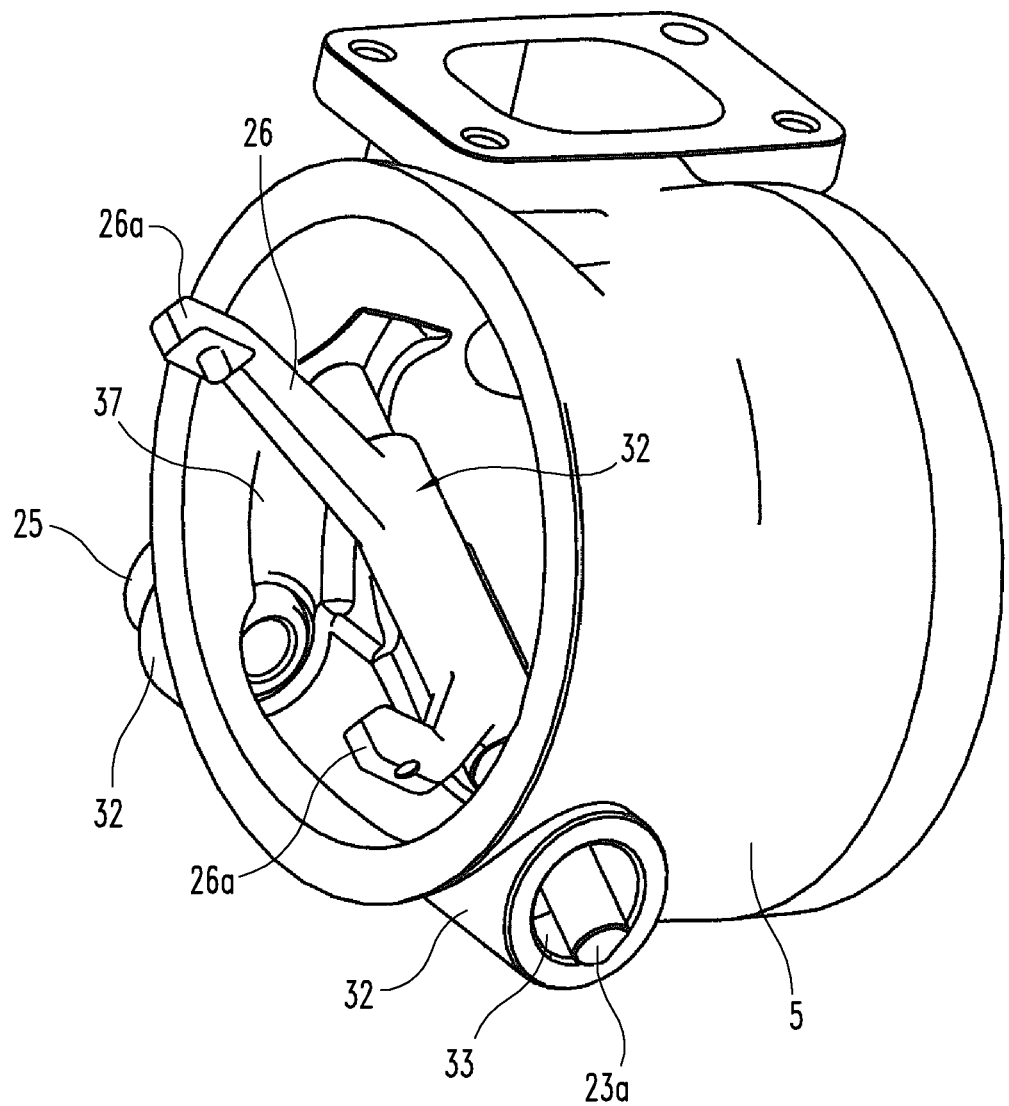
FIG. 7 is a perspective view from one side of the turbine housing and yoke in the position corresponding to that of FIGS. 5 and 6.
Figure 8:
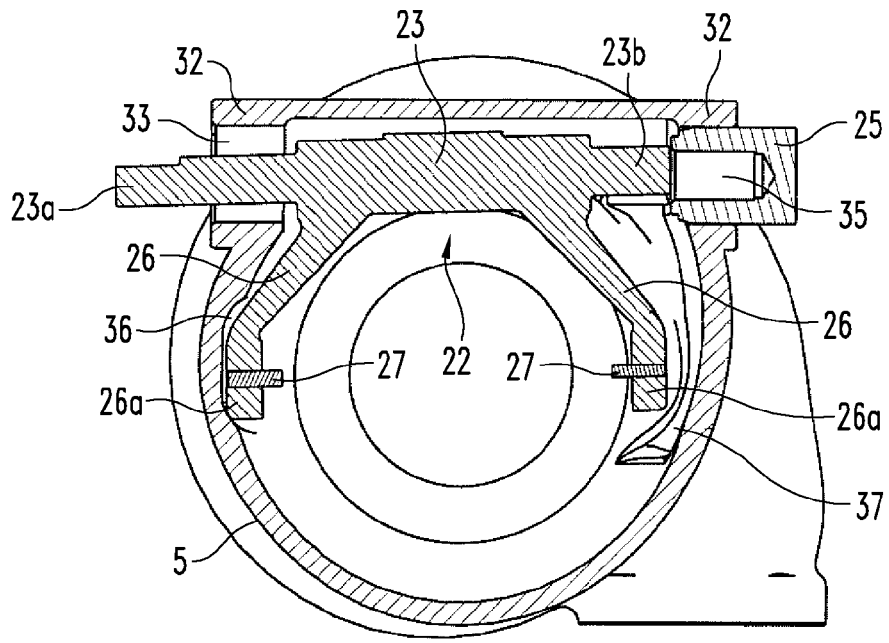
FIG. 8 is a sectioned view looking into the inlet end of the turbine, showing the final stage of insertion of the yoke.
Figure 9:
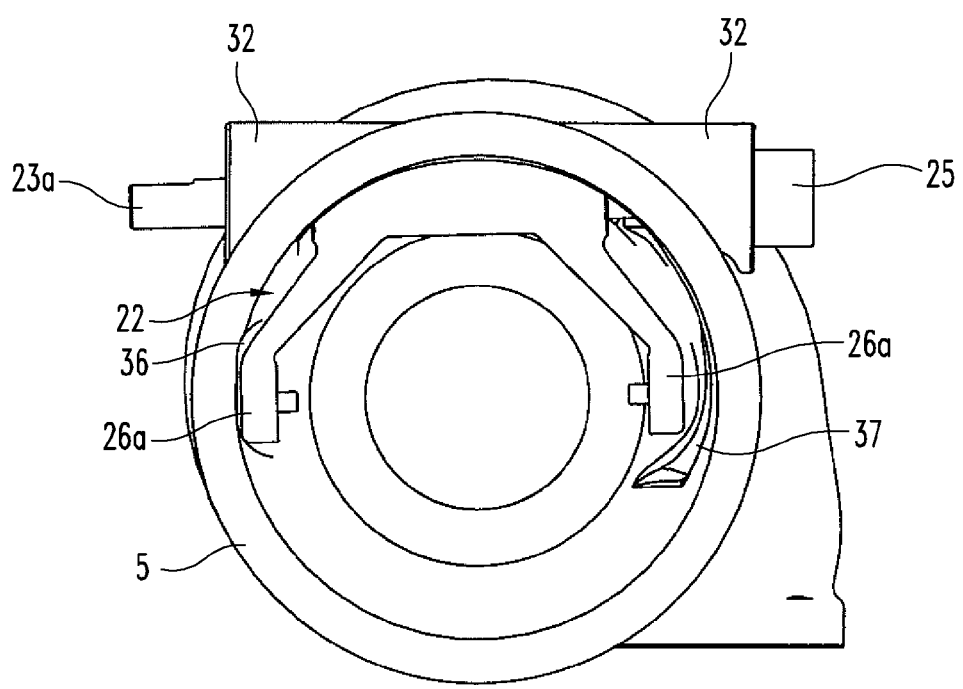
FIG. 9 is a view looking into the inlet end of the turbine, with the yoke shown in the position of FIG. 8.
Figure 10:
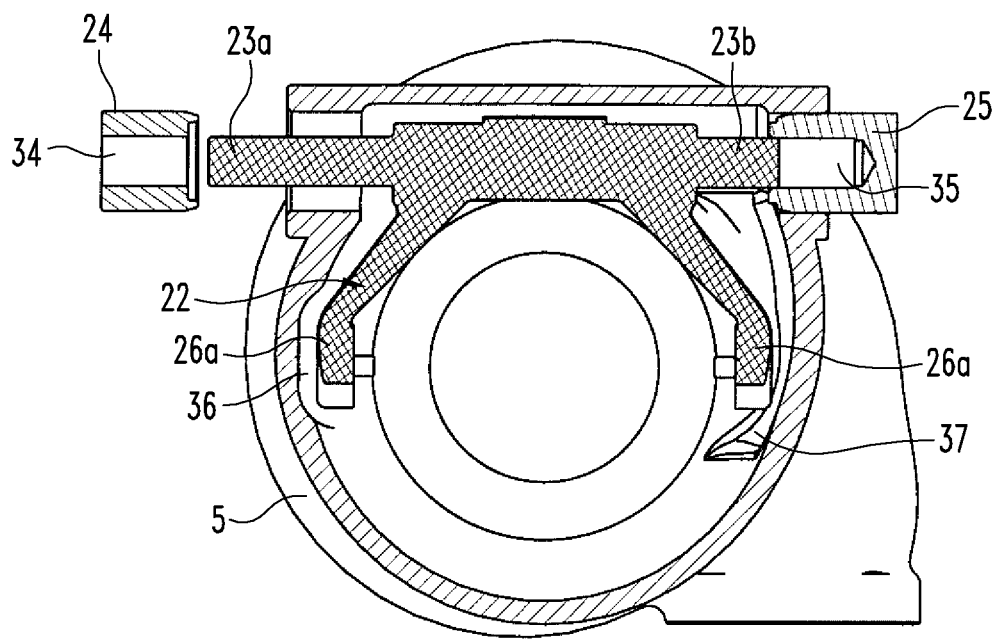
FIG. 10 is a sectioned view corresponding to that of FIG. 8, illustrating insertion of a yoke bearing.

First the bearing 25 with the blind bore 35 is partially inserted into its boss 32 such that its blind end extends out of the boss 32 as shown in FIG. 2. The yoke 22 is then presented to the turbine housing 5 at the outlet end with the first end 23a of the shaft 23 being presented into the opposite open boss 32 with the shaft axis inclined to an axis extending between the centres of the bosses 32, as shown in FIG. 3. The yoke shaft 23 may be rotated about its axis such that the arms 26 extend outwards from the open outlet passageway 12 as shown in FIG. 4. With the first end 23a extending into and beyond the boss 32, the opposite second end 23b of the shaft 23 is then lowered past the edge of the outlet passageway 12 and into the recess 37 as illustrated in FIGS. 6 and 7. The yoke 22 is then rotated roughly about the turbine axis such that shaft axis is brought into alignment with the bosses 32. During this movement the second end of the shaft 23b passes along the length of the recess 37. FIGS. 8 and 9 show the yoke just before it reaches its final position.

Once the yoke shaft 23 is aligned with the axis passing between the centres of the bosses 32, the bearing 24 is inserted into its boss 32 over the first end 23a of the yoke shaft (FIG. 10), until it is fully received (FIG. 11) and other bearing 25 is pushed fully home into the boss to support the shaft. In this position the yoke 22 is free to rotate about its axis with the arms end 26a sweeping through the recess 36.

In order to connect the yoke 22 to the sliding shroud sleeve 18, the shaft is rotated such that the arm ends 26a project out of the outlet passageway 12. The sliding blocks 28 are then connected to the pins 27 and the sleeve 18 inserted into the turbine housing 5 such that it is concentric with the turbine axis. The sleeve 18 is positioned such that the slots 30 between the ribs 29 are axially aligned with the sliding blocks 28 but are angularly offset therefrom, as shown in FIG. 12. The sleeve 18 is then rotated such that the ribs 29 pass over the sliding blocks 28 which then reside in the slots 30, as illustrated in FIG. 12a.

The shroud support cylinder 19 is inserted into the shroud sleeve 18 from the outlet opening 10 and the turbine wheel 4 inserted from the other end before the bearing housing 3 is connected so as to complete the main parts of the turbine assembly, the completed assembly being depicted in FIGS. 1 and 1a.

The actuator is then mounted on a bracket (not shown) connected to exterior of the turbine housing 5 and connected to the yoke shaft 23 by, for example, a lever arm.

In operation the actuator is controlled to rotate the yoke 22 about its shaft axis. The arms 26 of the yoke sweep through a sector of a circle with the ends 26a each describing an arc. This movement is translated into movement of the shroud sleeve 18 and plate 14 in the direction of the turbine axis by inter-engagement of the pins 27, sliding blocks 28 and the ribs 29 on the sleeve 18. The blocks 28 push against the ribs 29 to move the sleeve with off-axis motion being accommodated by the blocks 28 pivoting on the pins 27 and sliding within the slots 30 between the ribs 29. Thus as the yoke 22 rotates about the shaft axis the sliding shroud sleeve 18 and plate 14 move axially to vary the size of the inlet passageway 13.

The arrangement described above provides for a compact turbine housing with a relatively small spatial envelope. The recesses 36, 37 allow for easy and quick insertion of the yoke 22 and accommodate its subsequent rotation by virtue of being disposed at or proximate to the arc described by the ends 26a of the arms. The provision of a yoke in which the shaft and arms are integrally formed so as to provide as unitary (i.e. single-piece) yoke structure simplifies the manufacturing process and reduces the attendant cost. It eliminates angular misalignment between the yoke arms and shaft of the prior art designs and provides for a more compact design in that it removes the need for a clamping feature to clamp the yoke arms to the shaft.

Numerous modifications and variations may be made to the exemplary design described above without departing from the scope of the invention as defined in the claims. For example, the above described arrangement may be used to move a nozzle ring axially relative to a fixed shroud plate. Furthermore, at least one of the apertures defined by the bosses may not penetrate through the housing but may be in the form of a blind bore. Finally, the exact shape of each of the recesses 36 and 37 may vary from those described and shown whilst still providing the same function.

While the invention has been illustrated and described in detail in the drawings and foregoing description, the same is to be considered as illustrative and not restrictive in character, it being understood that only the preferred embodiments have been shown and described and that all changes and modifications that come within the scope of the inventions as defined in the claims are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A variable geometry turbine comprising a turbine wheel mounted within a housing for rotation about a turbine axis, a gas flow inlet passage upstream of said turbine wheel, and a gas flow control mechanism located within the housing upstream of said turbine wheel and operable to control gas flow through said gas flow inlet passage, the control mechanism comprising a movable member for varying the size of the gas flow inlet passage, the movable member being movable in a direction substantially parallel to the turbine axis, a transmission mechanism for connection between an actuator and the control mechanism. for converting movement applied by the actuator into movement of the movable member, the transmission mechanism comprising a yoke having a shaft that is rotatably supported in at least one support provided in an inner wall of the housing for rotation about a shaft rotation axis, the yoke defining arms that extend outwardly of the shaft and which engage with the movable member such that rotation of the yoke effects movement of the movable member, wherein there is provided at least one recess defined in an inside surface of the housing, the at least one recess extending away from the at least one support and away from the shaft rotation axis, the at least one recess configured to allow passage of an end of the yoke shaft along it during insertion of the yoke into the housing, wherein the arms each have an end distal from the shaft and rotation of the yoke about its shaft causes the ends to describe an arc of a circle, at least one further recess being defined in the inside surface of the housing proximate one of the arcs.

2. A variable geometry turbine according to claim 1, wherein the at least one recess is elongated.

3. A variable geometry turbine according to claim 1, wherein the at least one support comprises a first bore or recess defined in the wall.

4. A variable geometry turbine according to claim 3, wherein the at least one support further comprises a first bearing in the first bore or recess.

5. A variable geometry turbine according to claim 3, wherein the at least one recess extends from the first bore.

6. A variable geometry turbine according to claim 3, wherein the at least one support further comprises a second bore or recess in the housing wall.

7. A variable geometry turbine according to claim 6, wherein the at least one further support further comprises a second bearing in the second bore or recess.

8. A variable geometry turbine according to claim 7, wherein there is a provided a first journal bearing in the first bore and a second journal bearing in the second bore, the first journal bearing defining a blind bore for receipt of one end of the yoke shaft and the second journal bearing defining a through bore for receipt of an opposite end of the yoke shaft.

9. A variable geometry turbine according to claim 3, wherein the first bore is defined by a boss for receipt of the shaft in rotation, 10. A variable geometry turbine according to claim 9, wherein the at least one recess extends from the interior of the at least one boss.

11. A variable geometry turbine according to claim 1, wherein at least one of the distal ends is connected to the movable member.

12. A variable geometry turbine according to claim 1, wherein the at least one recess extends in a substantially circumferential direction defined around an imaginary line occupied by the rotational axis of the turbine.

13. A variable geometry turbine according to claim 1, wherein the yoke is disposed between the housing and the movable member.

14. A variable geometry turbine according to claim 1, wherein the shaft and arms of the yoke are integrally formed.

15. A variable geometry turbine according to claim 1, wherein the housing defines a turbine outlet end, the yoke being disposed at or near the outlet end.

* * * * *